March 28, 1933.  W. C. GRAHAM  1,903,215
METHOD FOR THE PURIFICATION OF SOLUTIONS
Filed Feb. 13, 1925
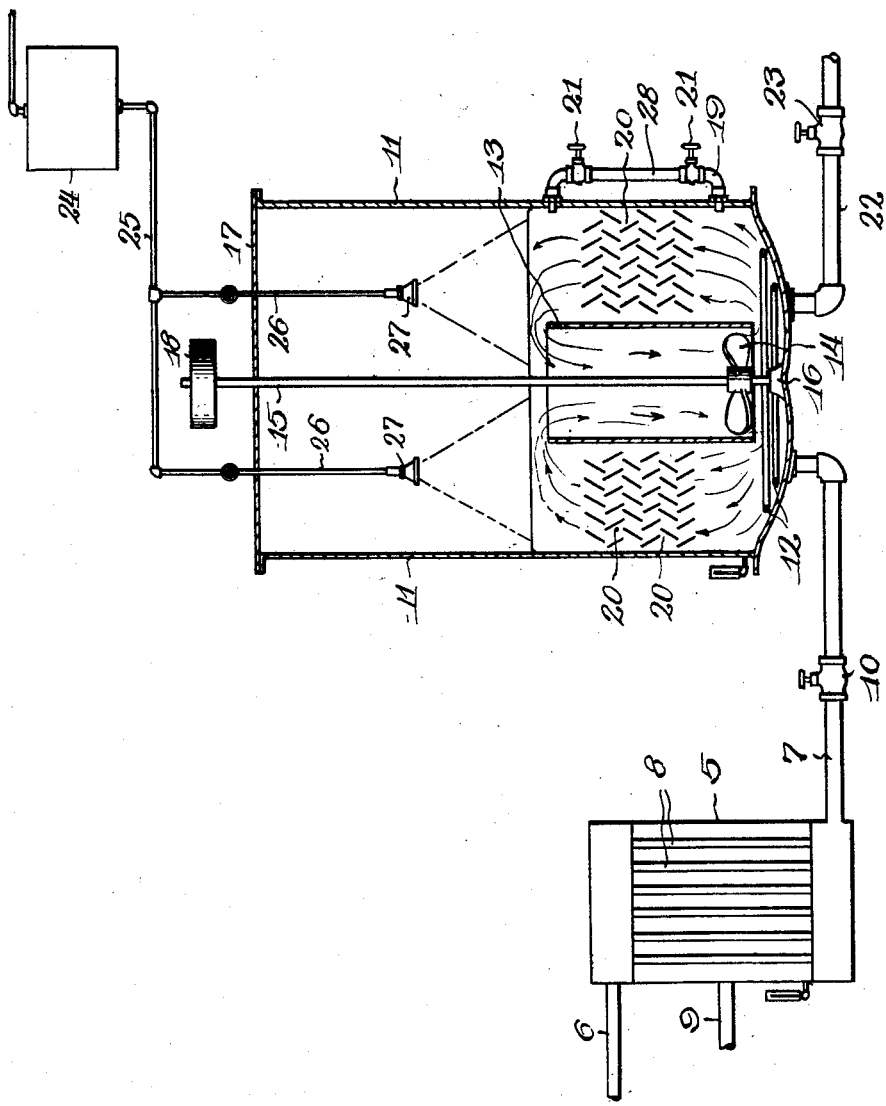

Patented Mar. 28, 1933

1,903,215

UNITED STATES PATENT OFFICE

WALTON C. GRAHAM, OF DENVER, COLORADO, ASSIGNOR TO GILCHRIST & COMPANY, A CORPORATION OF DELAWARE

METHOD FOR THE PURIFICATION OF SOLUTIONS

Application filed February 13, 1925. Serial No. 9,030.

The present invention relates to improvements in methods for the purification of solutions containing heat coagulable colloids and colloids precipitated by changes in hydrogen ion concentration, for example, sugar containing juices, more particularly sugar cane juice and sugar beet juice. It will be fully understood from the following specification, illustrated by the accompanying drawing, in which apparatus suitable for carrying out the invention is shown diagrammatically.

In the purification of the juice of the sugar cane, it has hitherto been customary to add to the juice lime or an alkaline lime compound in sufficient quantity to bring the juice to approximate neutrality, or, in the case of the sugar beet juice, to a decided alkalinity, and heat the treated juice. The purpose of this operation, designated liming or defecation, has been the removal of nitrogenous bodies, particularly those albumenoid in character, other organic colloids, and the like. In the methods as hitherto carried out, a precipitate or coagulum is formed which is exceedingly difficult to handle by filtration or other processes, and a decided discoloration of the juice is produced, apparently resulting from the localized action of the lime on the glucose and similar simpler sugars present in the juice. The method of the present invention as hereinafter described, obviates these defects, effecting the purification of the juice with the formation of a precipitate or coagulum which settles rapidly, bringing the juice into a state in which it may be readily and quickly filtered, and causes substantially no discoloration of the juice.

The process is similarly applicable to the treatment of sugar beet juice, glucose liquors derived from conversion of starch, lævulose containing solutions, sewage, and other similar materials, the control of temperature and hydrogen ion concentration in each case being varied in accordance with the principles hereinafter set forth.

In carrying out the method of the present invention, a body of the cane juice, for example, which has preferably been preheated to a temperature sufficient to cause at least an incipient coagulation of albumenoid material, is set into rapid movement causing a continuous intermingling of the liquid body upon itself, preferably in a circular path, and adding a suitable reagent to the liquid, while in motion, in finely dispersed form and at a substantially constant rate. The rapid circulation of the liquid upon itself, together with the gradual addition of the reagent in finely dispersed form, results in a substantially uniform and progressive reaction of the reagent upon the entire body of the juice, without irregularity of action at localized points therein. The change in hydrogen ion concentration aids in agglomerating the coagulated colloids and in putting them in condition for rapid settling, and also causes a further precipitation of colloids.

The action of the reagent, in carrying out the invention, is preferably controlled by visual inspection, both the color of the juice and the rapidity of settling of the precipitate or coagulum being observed. In order to make this inspection of the liquid during operation, provision is made for the segregation at will of a small portion of liquid from the rapidly circulating body with which the reagent is being mixed. This segregated portion of liquid is held quiescent momentarily for inspection, its condition determined, and if found satisfactory, the addition of reagent is discontinued, and the liquid discharged. The juice may then be filtered or allowed to settle and the liquid portion thereof removed by decantation. The precipitate settles rapidly, filters quickly and without clogging and the juice is substantially free from dark coloration.

In the apparatus shown in the drawing, I have illustrated means whereby the invention may be carried out. The numeral 5 indicates a preheater, suitably of the tubular type. The juice to be treated enters through pipe 6 and makes its exit through pipe 7, passing through the tubes 8 in the preheater. Steam, under pressure, if desired, is supplied to the space around the tubes 8 through the pipe 9. In the preheater 5, the juice is rapidly brought to a temperature sufficient to cause at least an incipient coagulation of albumenoids, or any other heat coagulable substance, the temperature being above 160° F. and preferably above 190°; say up to 240° F. Pressure may be employed to secure the required temperature, if desired. Ordinarily the juice may be brought to a temperature of 200° to 212° F. At least a partial coagulation of albumenoid material takes place as a result of this heating, the coagulated particles forming a nucleus upon which further precipitation or agglomeration may take place in the subsequent treatment of the juice.

Instead of heating the incoming liquid, it may be desirable to cool it in some cases. Under these circumstances, cooling means may be employed and the temperature thereafter raised, lowered, maintained constant, or otherwise regulated, in accordance with the particular process being carried out and the material being treated.

From the preheater 5, the juice flows through the pipe 7, controlled by valve 10, into a chamber 11, in the base of which a suitable heating means, such as the steam coil 12, may be provided. At a suitable central position in the chamber 11, there is provided a central tube 13, open at the top and at the bottom, and of a shape preferably subsantially conforming to the cross-section of the chamber. A rotatable propeller 14 is arranged within the tube 13, preferably near its lower open end, the propeller 14 being mounted on shaft 15, suitably stepped in a bearing 16 in the base of the chamber 11 and projecting at its upper end through the cover 17 of the chamber. The shaft 15 is provided with a suitable pulley 18 or other means by which it and the propeller 14 may be rapidly rotated. The tube 13 terminates at its lower end somewhat above the bottom of the chamber 11, and at its upper end somewhat below the normal level of the liquid in the chamber. The shaft 15 and the propeller 14 are set in rapid rotation, the propeller causing an extremely rapid and uniform movement of the liquid downwardly through the tube 13, out and upwardly around the exterior of the tube, thus circulating rapidly and continuously upon itself. In ordinary operation the liquid is thus circulated upon and thoroughly intermingled with itself with great rapidity, the the intermingling of the liquid being greatly multiplied by the staggered vanes 20. During this operation, the liquid preferably is maintained near or only slightly below the temperature at which it enters the chamber by means of the heating medium in the coils 12; say within 2 to 5° thereof. In some cases it may be desirable to heat the liquid in the preheater under pressure and to discharge it into the chamber at atmospheric pressure, in which case a considerable reduction in temperature may take place at this point. The rapid and continuous circulation of the liquid upon itself, together with the heat, causes a further coagulation of suspended particles therein, this coagulation and agglomeration being materially aided by the rapid circulation of the liquid.

A fresh surface of liquid is continuously presented to the finely divided reagent, this surface being immediately circulated upon and rapidly intermingled with great frequency within the remainder of the liquid.

It is ordinarily found that less proportions of the alkaline reagent are required for the complete clarification of the juice in carrying out the present process. Thus, the quantity of alkali required, in one case in which an acid juice was treated, calculated as calcium oxide, was approximately 0.025%. This reagent may be added to the juice in the form of finely ground caustic lime or slaked lime, dilute milk of lime, or as calcium sucrate. The reagent, if added in the form of lime or slaked lime, is powdered to a fine flour, and sprayed into the constantly circulated mass of liquid gradually and at any suitable rate. If used in the form of milk of lime or calcium sucrate, a dilute suspension or solution, say about 2%, is employed, and likewise sprayed in gradually and at any suitable rate during the circulation of the liquid. The reaction takes place rapidly and the operation may be controlled, suitably by inspection, as hereinafter pointed out, to secure the desired capacity and speed of operation. The reagent is suitably supplied from a receptacle 24 through pipe 25 to the valved pipes 26 which pass through the cover 17 of the chamber 11 and terminate in suitable spray heads 27, above the normal liquid level in the chamber.

In order to observe the condition of the liquid, a by-pass conduit 19 is disposed vertically on the exterior of the chamber 11, communicating therewith at both ends below the liquid level in the chamber. A portion of this conduit, designated by the numeral 28, is suitably constructed of transparent material, such as glass, and valves 21 are provided on each side thereof. At any time in the operation of the process, by opening both valves 21, the conduit 19 and the transparent portion 28 may be filled with liquid in the same condition as that on the interior of the chamber. By then closing the lower valve 21 or both valves, this portion of the liquid may be segregated and its condition noted. The proper condition of the liquid for the termination of the addition of the reagent may be determined almost instantaneously by the rapidity of settling of the flocs or particles in the portion of liquid segregated in the conduit 19, and by its color. When it is seen to settle almost instantaneously, and to be of the proper color, the addition of the reagent is stopped, and the liquid drawn off from the chamber 11 through the pipe 22, provided with valve 23. This point is substantially always found to be at approximately pH7, say from pH6.5 to pH8. The juice is then found to settle with great rapidity, to filter with ease, and without clogging the filter, and to show substantially no traces of discoloration. There appears to be, under the condition described, a marked absorption of coloring matter and other colloid materials by the agglomerating matter.

If desired, by proper control of the inlet and outlet valves 10 and 23, the operation of the process may be made continuous, reagent being continuously supplied as required.

The operation of the process, although described more particularly in connection with the treatment of sugar cane and sugar beet juices, is not to be regarded as limited thereto, but may be applied also to other material containing colloid matter susceptible to coagulation or precipitation by heating, by change of hydrogen ion concentration, or by both. In some cases it is further advantageous to add an inert material, such as brick dust, or the like, to the liquid. The advantage of this addition is that such inert material becomes incorporated with the agglomerated coagules and increases the gravity of the same, which materially accelerates settling. The process is highly flexible, permitting the controlled use of heat, agitation or a neutralizing reagent, or any two or all of said agents. It also permits of the determination and control of the optimum condition of operation by immediately available, visual means.

The flocs of coagulated colloids herein referred to are the result of bringing together by agitation coloids already coagulated by change of hydrogen-ion-concentration, the coagulated coloids adhering to each other to form large flocs, or cohering masses of coagulated colloids.

I claim:

1. The method of treating non-neutral colloid containing liquids to remove colloids held in dispersion therein which comprises maintaining a body of said liquid in constant agitation while adding thereto progressively and uniformly a neutralizing reagent, the agitation and the addition of the reagent being regulated to thereby cause a gradual change in hydrogen-ion-concentration of the liquid in all parts thereof and to prevent localized over-neutralizing, continuing said agitation and addition of reagent until the whole liquid attains a uniform optimum condition of hydrogen-ion-concentration to effect maximum coagulation of said colloids, regulating the internal agitation of the body of liquid and continuing it for a period sufficient to promote complete and uniform flocculation and at a rate insufficient to prevent cumulative growth and maintenance of large flocs of already coagulated colloidal matter, and thereafter separating the coagulated colloids from the liquid.

2. The method of treating liquids which contain colloids precipitated by change in hydrogen-ion-concentration which comprises maintaining a relatively large body of said liquid continuously circulating in a closed cycle, continuously adding to said body relatively small quantities of fresh liquid and withdrawing from said body continuously relatively small quantities of treated liquid, gradually adding to said circulating body regulated quantities of a reagent capable of changing the hydrogen-ion-concentration to the optimum condition favorable to the maximum coagulation of said colloids, regulating and limiting the addition of the reagent and providing thorough dispersion and intermingling of it with all parts of the liquid to obtain a uniform optimum hydrogen-ion-concentration and to avoid localized overaction which might result in redispersion of the already coagulated colloids and excessive exothermic reaction with the liquid with resultant ill effects thereon, and separating the coagulated colloids from the treated liquid withdrawn from said body.

3. The method of treating liquids which contain colloids coagulated by change of hydrogen-ion-concentration which comprises maintaining a relatively large body of said liquid in continuous circulation in a closed cycle and providing repeated continuous uniform intermingling of all of its portions within said body, adding continuously to said body untreated liquid in quantities small relative to the size of said body, continuously withdrawing from the body like small quantities of treated liquid, maintaining in substantially the entire body of said liquid a hydrogen-ion-concentration most favorable to the coagulation of said colloids, continuously adding to said body small quantities of a reagent adapted to maintain said optimum hydrogen-ion-concentration in said body, the addition of the fresh liquid, the withdrawal of the treated liquid, the addition of the reagent, and the internal intermingling of the portions of the liquid being regulated and conducted to maintain uniformly and continuously throughout all portions of the liquid said optimum hydrogen-ion-concentration and avoiding localized excessive and insufficient reaction between the reagent and the liquid.

4. The method of treating liquids containing colloids coagulable by change of hydrogen-ion-concentration which comprises repeatedly recirculating a relatively large body of said liquid in a closed cycle, gradually adding in relatively small quantities a reagent adapted to change the hydrogen-ion-concentration of said liquid, quickly and uniformly dispersing said added reagent throughout the entire body and simultaneously uniformly intermingling all portions of said body of liquid by effecting repeated changes of direction of the flowing liquid relative to the heavier colloids carried thereby and repeatedly subdividing the flowing liquid in a plurality of streams and uniting portions of each stream with portions of other streams, continuously adding relatively small quantities of fresh liquid to said body and continuously withdrawing treated liquid in small quantities from said body, regulating the addition and withdrawal of the liquid and the addition of the reagent to maintain continuously in said body the optimum condition of hydrogen-ion-concentration favorable to the maximum coagulation of colloids and avoiding excessive localized action of the reagent, and removing the coagulated colloids from the liquid so withdrawn.

5. The method of treating sugar-containing plant juices to remove by precipitation colloids coagulated by change of hydrogen-ion-concentration comprising repeatedly recirculating a body of the juice in a closed cycle and continuously uniformly intermingling all portions of the liquid within said body, gradually adding to said recirculating liquid small quantities of a reagent and quickly and uniformly dispersing the added reagent throughout the entire body causing the hydrogen-ion-concentration of the liquid to gradually and progressively throughout all portions of the body approach the optimum condition for coagulation of said colloids and avoiding excessive local alkalinity and localized inversion of the sugar and redispersion of the colloids, and thereafter removing completely treated liquid from said body and separating the coagulated colloids from the liquid.

6. The method of treating sugar-containing plant juices to remove colloids therefrom which are coagulable by change of hydrogen-ion-concentration which comprises repeatedly recirculating a relatively large body of said juice in a closed cycle, gradually adding to the juice small quantities of an alkaline reagent capable of changing the hydrogen-ion-concentration of the juice, quickly and uniformly dispersing the added reagent throughout all portions of the juice, continuously adding relatively small quantities of fresh juice to said body and withdrawing similar small quantities of treated juice continuously from said body, regulating the addition and withdrawal of the juices and the addition of the reagent and conducting the mixing of the reagent with all of the juice to effect gradual and progressive growth of flocs of the coagulated colloids and avoiding any substantial combination of the reagent with the crystallizable sugar, and removing the coagulated colloids from the juices so withdrawn.

7. The method of treating sugar-containing plant juices to remove therefrom colloids coagulable by change of hydrogen-ion-concentration in the juice which comprises recirculating a relatively large body of said juice in a closed cycle, gradually adding thereto an alkaline reagent adapted to change said hydrogen-ion-concentration, quickly dispersing said added reagent uniformly throughout said body and simultaneously continuously intermingling all portions of the juice within the body to effect gradual and progressive uniform change of hydrogen-ion-concentration throughout the entire body of juice, maintaining the hydrogen-ion-concentration in said entire body within a range most favorable to the maximum coagulation of said colloids without causing redispersion of the coagulated colloids, continuously adding fresh juice to said body and withdrawing treated juice from said body both in relatively small quantities, regulating the addition and withdrawal of juice and the addition of reagent and the mixing of the reagent with the juice to maintain said optimum hydrogen-ion-concentration and to avoid excessive localized action of the reagent and preventing any substantial combination of the reagent with the crystallizable sugar, and removing the coagulated colloids from the juice so withdrawn.

8. A method of treating sugar-containing plant juices to remove colloids therefrom coagulable by change of hydrogen-ion-concentration which comprises repeatedly recirculating a body of the juice in a closed cycle and maintaining a smooth surface flow thereon, adding an alkaline reagent gradually to the smooth surface in finely dispersed form, agitating the juices to quickly and uniformly disperse the reagent throughout the entire body of the juice by dividing and subdividing in a uniform manner the internally circulating juice into a plurality of streams which are repeatedly reunited and resubdivided with their directions constantly undergoing changes, said streams of juice being uniformly intermingled with each other and the reagent to effect gradual and progressive change of hydrogen-ion-concentration and gradual growth of flocs of the coagulated colloids without breaking down the flocs by too violent agitation and preventing any substantial exothermic reaction between the reagent and juice, withdrawing completely treated juice from said body and separating the coagulated colloids therefrom.

9. In a process of manufacturing sugar in which the sugar bearing juice is treated to precipitate impurities, the step which comprises agitation of the treated juice for a period sufficient to obtain substantially complete flocculation and at a rate adequate to maintain a substantially uniform suspension of all flocs but insufficient to prevent the formation and maintenance of flocs of substantially maximum size.

10. In a process of manufacturing sugar in which the sugar bearing juice is treated to precipitate impurities, the step which comprises the continuous preparation of the treated juice for sedimentation by agitating a continuously flowing stream of juice during a detention period between the influx and the discharge of the juice sufficient to obtain substantially complete flocculation in the effluent and at a rate adequate to maintain a substantially uniform suspension of all flocs in all portions of the juice which have been subjected to the agitation for substantially the same period of time, but insufficient to, prevent the formation and maintenance of flocs of substantially maximum size in any part of the juice undergoing continuous agitation.

11. In a process of manufacturing sugar in which the sugar bearing juice is treated to precipitate impurities, the step which comprises subjecting the treated juice to agitation without imparting swirling motion to the body of juice, and for a period sufficient to obtain substantially complete flocculation and at a rate adequate to maintain a substantially uniform suspension of settleable solids but insufficient to prevent the formation and maintenance of effective flocs.

12. In a process of manufacturing sugar in which the sugar bearing juice is treated to precipitate impurities, agitating a body of the treated juice for a period sufficient to obtain substantially complete flocculation and at a rate adequate to maintain substantially uniform suspension of all flocs while adding thereto fresh juice and treating reagents proportioned to maintain substantially uniform conditions in the body, the agitation being insufficient to prevent the formation and maintenance of flocs of substantially maximum size.

13. In a process of manufacturing sugar in which the sugar bearing juice is treated to precipitate impurities, the steps in the continuous preparation of the treated juice for sedimentation which comprise agitating a body of juice in continuous flux between its influx and discharge during a detention period sufficient to obtain substantially complete suspension in the effluent and at a rate adequate to maintain substantially uniform suspension of all flocs in all portions of the body of juice but insufficient to prevent the formation and maintenance of flocs of substantially maximum size therein, and adding continuously to said body fresh juice and a treating reagent proportioned to maintain a substantially uniform hydrogen-ion-concentration throughout the body thereof.

In testimony whereof, I have subscribed my name.

WALTON C. GRAHAM.